US006456292B1

(12) United States Patent
Chan et al.

(10) Patent No.: US 6,456,292 B1
(45) Date of Patent: Sep. 24, 2002

(54) METHODS AND DEVICES TO CREATE HIGHLIGHT EFFECTS IN MULTIMEDIA DATA

(75) Inventors: Tak S. Chan, San Jose, CA (US); You-Wen Yi, Milpitas, CA (US)

(73) Assignee: Oak Technology, Inc., Sunnyvale, CA (US)

(*) Notice: Subject to any disclaimer, the term of this patent is extended or adjusted under 35 U.S.C. 154(b) by 0 days.

(21) Appl. No.: 09/480,806

(22) Filed: Jan. 10, 2000

(51) Int. Cl.[7] ................................................ G09G 5/02
(52) U.S. Cl. ..................................................... 345/589
(58) Field of Search ................................ 345/589, 591, 345/600, 619, 620, 781, 790, 792, 802, 803; 348/596, 564, 565, 588; 382/162, 163, 164, 166, 173, 205, 282

(56) References Cited

U.S. PATENT DOCUMENTS 5,384,912 A * 1/1995 Ogrinc et al. ............... 395/165
5,883,640 A * 3/1999 Hsich et al. ................. 345/503

OTHER PUBLICATIONS

Video Demystified, Keith Jack, 1996, High Text Plblications, Second Edition, pp. 40–41.*

Middle East Technical University's Internet Web page, last modified Jul. 7, 1998, [retrieved on Dec. 5, 2001]. Retrieved from the Internet:<URL: http://www.ii.metu.edu.tr/nli/courses/cyberimg/lectures/2/6/13/index.html>.*

* cited by examiner

Primary Examiner—Jeffery Brier
Assistant Examiner—G. F. Cunningham
(74) Attorney, Agent, or Firm—Young Law Firm, P.C.

(57) ABSTRACT

Methods and devices for selectively highlighting one or more regions of arbitrary shape on a display. The method for creating highlight effects in multimedia data (data including video and/or graphics, for example) includes the steps of receiving a video and/or graphics data stream from an input source; performing an arithmetic operation upon at least one color component value of constituent pixels of the data stream that are to be hightlighted to provide a selectively highlighted video and/or graphics data stream; and outputting the selectively highlighted video and/or graphics data stream directly to a display. The arithmetic operation may include addition or subtraction. Because the original multimedia data in memory is not modified or copied in order to create the highlight effects, both memory bandwidth and area are saved. Moreover, once highlighting is turned off, the original (non-highlighted) data may be immediately re-displayed.

33 Claims, 3 Drawing Sheets

METHODS AND DEVICES TO CREATE HIGHLIGHT EFFECTS IN MULTIMEDIA DATA

BACKGROUND OF THE INVENTION

1. Field of the Invention

This invention relates to devices and methods to create highlight effects upon all or a selected portion of a multimedia (including video, audio and/or graphics) data stream. More particularly, the present invention relates to devices and methods to create highlight effects upon selected portions of a multimedia data stream on the fly without modifying the original multimedia data (pixel information, for example) stored in memory.

2. Description of the Related Art

The convergence of personal computer and entertainment devices has given rise to hybrid devices that combine the attributes of both. For example, users now may use the same device to run conventional personal computer applications and to watch movies or other video clips, for example. Often, users of such devices use a cursor or other on-screen pointer to designate a window or selection on a display as the currently active window or selection. For example, the user may designate a window or selection as active by placing or moving the cursor over the window or selection. The designated window or selection is then typically highlighted, meaning that its appearance is changed. A highlighted window or selection is usually brighter, to differentiate it from other, non-active windows or selections present on the display.

Conventionally, such highlight effects are created by moving or copying the pixel information of the designated window or selection from its original location in memory to a new memory location, and by modifying the moved or copied pixel information to create the desired highlight effect. The memory may be frame buffer including a Dynamic Random Access Memory (hereafter "DRAM"). The modified pixel information may then be retrieved from the new location in the DRAM and output to a display as a highlighted version of the original video and/or graphics data. When the designated window and/or selection is deselected, the original pixel information is swapped back from its new location to its original location in the DRAM.

The DRAM may be external to the graphics and video decoder or may be internal thereto. In any event, the highlighted video and/or graphics data stream must be transferred into and out of the DRAM in a sufficiently rapid manner as to keep pace with the incoming data originating from, for example, a Digital Versatile Disk (DVD) device. Thus, the bandwidth of the video and/or graphics decoder—external memory interface is a significant consideration in the design of such digital video and/or graphics processing devices. There is a need, therefore, to devise methods and devices that reduce the need for high-bandwidth interfaces between the graphics processor and the DRAM. The process of swapping pixel information into and out of a frame buffer, moreover, is a time consuming one. Indeed, the delays caused by repeated swapping pixel information into and out of memory may visibly slow down the highlighting process, such that the highlighting process appears to be incomplete while the pixel swapping is being carried out. What are also needed, therefore, are methods and devices to create highlight effects in a video and/or graphics data stream that do not necessitate repeated swapping of pixel information into and out of memory and that do not incur the delays attendant with such swapping.

SUMMARY OF THE INVENTION

The present invention, therefore, provides devices and methods for methods and devices that reduce the need for high-bandwidth interfaces between the graphics processor and the DRAM. The present invention also provides methods and devices to create highlight effects in a video and/or graphics data stream that do not necessitate repeated swapping of pixel information into and out of memory and that do not incur the delays attendant with such swapping.

In accordance with the principles of the invention above and those that will be mentioned and will become apparent below, a method for creating highlight effects in video and/or graphics data comprising the steps of receiving a video and/or graphics data stream from an input source; performing an arithmetic operation upon at least one color component value of constituent pixels of the data stream that are to be hightlighted to provide a selectively highlighted video and/or graphics data stream; and outputting the selectively highlighted video and/or graphics data stream directly to a display.

According to further embodiments of the present invention, the arithmetic operation may be either addition or subtraction. The input source may include a frame buffer, which may include a dynamic random access memory (DRAM). A step of clamping one or more color component values within a selected value range may be carried out. The value range may be selected based upon the color space of the video and/or graphics data stream.

The color component value(s) may be clamped to a selected respective predetermined high value when performance of the selected arithmetic operation results in the color component value exceeding the predetermined high value and may be clamped to a selected respective predetermined low value when performance of the selected arithmetic operation results in the color component value falling below the predetermined low value. When the color space of the video and/or graphics data stream is YCbCr, the predetermined high value for the Y color component value may be set to 235 and the predetermined high value for the Cb and Cr color component values may be set to 240. When the color space of the video and/or graphics data stream is YCbCr, the predetermined low value for the Y, Cb and Cr color component values may be set to 16. When the color space of the video and/or graphics data stream is YUV, the predetermined high value for the Y color component value may be set to 255, the predetermined high value for the U color component value may be set to 112 and the predetermined high value for the V color component value may be set to 157. When the color space of the video and/or graphics data stream is YUV, the predetermined low value for the Y color component values may be set to 0, the predetermined low value for the U color component value may be set to −112 and the predetermined low value for the V color component value may be set to −157.

A step of specifying a starting location and a size of a rectangular region wherein pixels of the data stream are to be highlighted may also be carried out. A highlight control bitmap data set may also be specified, each bit within the bitmap data set being associated with a pixel of the data stream and controlling the performance of the arithmetic operation. The arithmetic operation performing step may leave the color component value(s) unchanged when an associated bit within the bitmap data set is in a first logical state and may change the color component value(s) when the associated bit within the bitmap data set is in a second logical state. A clamping step may be performed to clamp the color component value(s) within a selected value range. A step of storing a highlight control bit in a control register may be carried out, the highlight control bit controlling the performance of the arithmetic operation. An incremental value may be defined for each of the color component value(s), each of the incremental values being either added to or subtracted from respective ones of the color component value(s) to highlight a pixel associated therewith.

The present invention may also be regarded as a multimedia decoder, including a memory bus and a control bus; a processor coupled to the memory bus and to the control bus, the processor controlling an operation of the decoder; a memory controller coupled to the memory bus, the memory controller being adapted to interface the decoder with a memory adapted to store video and/or graphics data, and a highlight processing module coupled to the memory and control buses, the highlight processing unit receiving a video and/or graphics data stream from the memory, and receiving instructions from the processor via the control bus to perform an arithmetic operation upon at least one color component value of each pixel of the data stream that is to be hightlighted to provide a selectively highlighted video and/or graphics data stream and to output the selectively highlighted video and/or graphics data stream to a display without updating the memory video and/or graphics data stored in memory.

According to further embodiments, the highlight processing module may include at least one programmable highlight control register, the programmable register(s) storing a highlight control value that is effective to enable and disable highlighting of the data stream. The highlight processing module may include internal memory, the internal memory being adapted to store a control bitmap data set, each bit within the bitmap data set being associated with a corresponding pixel of the data stream and controlling the performance of the arithmetic operation. The highlight processing module may clamp the color component value(s) within a selected value range that may be selected based upon the color space of the video and/or graphics data stream.

BRIEF DESCRIPTION OF THE DRAWINGS

For a further understanding of the advantages of the present invention, reference should be made to the following detailed description, taken in conjunction with the accompanying figures, in which.

DESCRIPTION OF THE INVENTION

Figure 1:
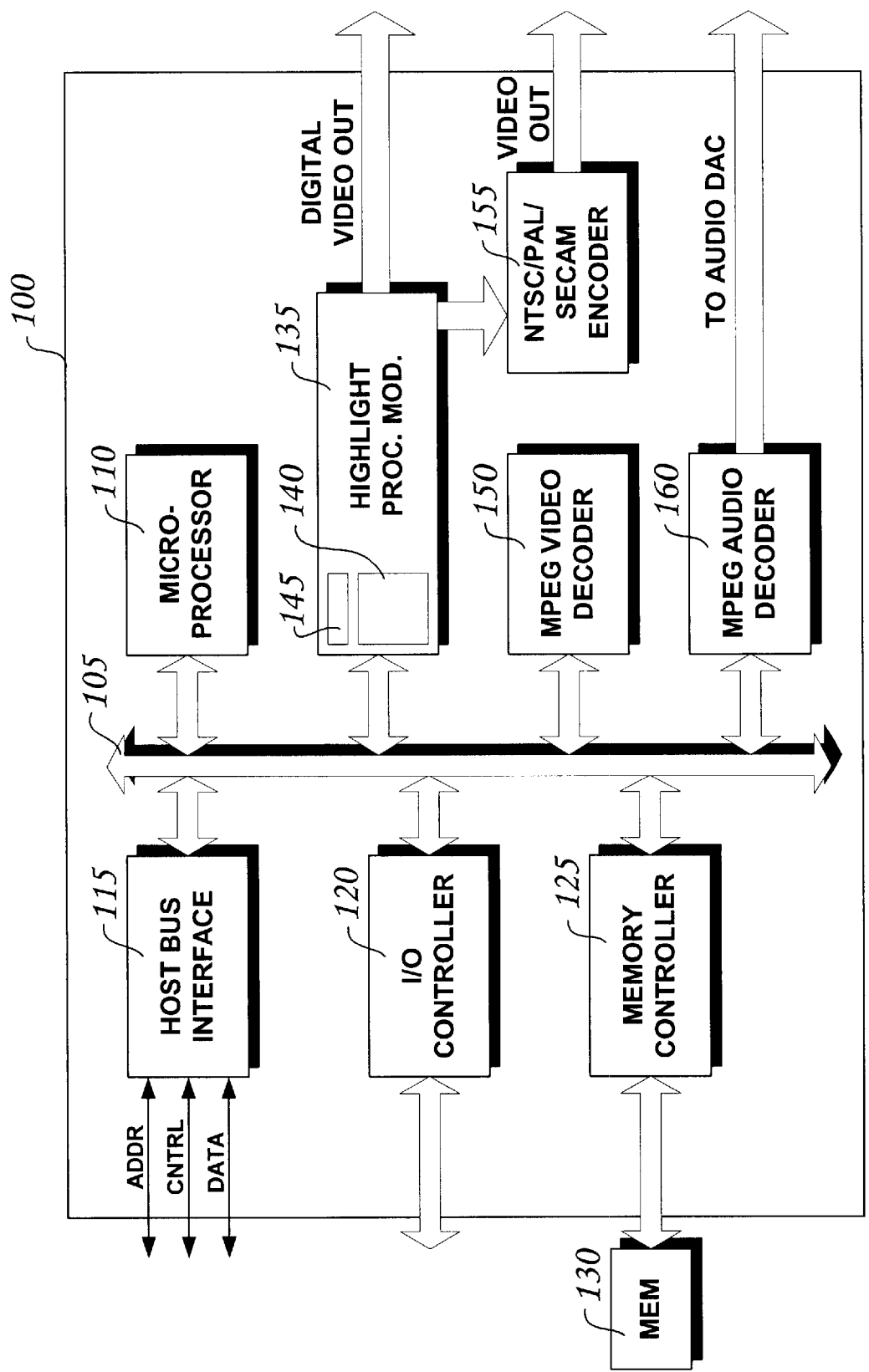
FIG. 1 is a block diagram of a video and graphics decoder according to an embodiment of the present invention.

FIG. 1 is a block diagram of a multimedia decoder 100 according to an embodiment of the present invention. The multimedia (graphics, video and/or audio) decoder 100 includes a memory bus and a control bus, collectively shown in FIG. 1 at reference numeral 105. Coupled to the bus 105 is a microprocessor 110 that controls the data flow within the decoder 100. A host bus interface 115 interfaces the bus 105 with the host device bus (not shown) via address, control and data lines. An I/O controller 120 is also coupled to the bus 105 and controls input and output operations to and from the decoder 100. A memory controller 125 coupled to the bus 105 controls memory accesses to and from the memory 130. For example, the memory 130 may include a DRAM frame buffer. MPEG (Motion Pictures Expert Group) video and audio decoders 150 and 160 decode the video and audio digital data, respectively, that is retrieved from the memory 130 or from another input source. The output of the Highlight Processing Module 135 is fed to a video encoder 155 that encodes the decoded video signal into a format compatible with, for example, the National Television Standards Committee (NTSC), the Phase Alternate Line (PAL) and/or the Systeme Electronique Couleur Avec Memoire (SECAM) protocols. The output of the audio decoder 160 is coupled to a digital to analog converter (not shown), the analog output of which drives a speaker or speaker system (not shown).

Also coupled to the bus 105 is a highlight-processing module 135. The highlight-processing module 135, according to an embodiment of the present invention, receives a stream of multimedia data from the memory 130 and instructions from the microprocessor 110 to perform an arithmetic operation upon at least one of the color component values of constituent pixels of the data stream. This arithmetic operation is carried out on the fly, without copying, moving or updating the video and/or graphics data stored in the memory 130. The results of the arithmetic operations performed upon the color component values of the constituent pixels of the input data stream provide a selectively highlighted video and/or graphics data stream that may be outputted to a display without updating the video and/or graphics data stored in the memory 130. This result in a faster processing of highlighted video and/or graphics data and reduces the need for high bandwidth interfaces between the memory 130 and the bus 105.

The arithmetic operation may be performed on each pixel of the input data stream or may be performed on only selected pixels thereof, as controlled by a highlight control value or values stored, for example, in one or more programmable highlight control registers 145.

In this manner, when the value stored in the highlight control register 145 is in a first logical state, the arithmetic operation is performed upon the current pixel being processed and when the value stored in the highlight control register 145 is in a second state opposite from the first state, the arithmetic operation is not performed upon the current pixel being processed. Alternatively, more than one highlight control register 145 may be provided and values may be stored therein to collectively represent an area indicating the range of pixels of the video and/or graphics data to be highlighted; that is, the range of pixels of the video and/or graphics data upon which the arithmetic operation is to be performed. For example, the values stored in the highlight control registers 145 may represent a starting location and a size of a rectangular region (such as a window on a display, for example) wherein pixels of the data stream are to be highlighted. Alternatively still, the highlight control value may be stored along with the color component values defining the pixel, the highlight control value thereby controlling whether the arithmetic operation is performed upon the pixel associated therewith. For example, the highlight control value may be stored as the "special attribute" described in the conmonly assigned U.S. patent application entitled "Method and Devices to Process Video and/or Graphics Data", Ser. No. 09/473,255 filed on Dec. 27, 1999, the disclosure of which is incorporated herewith in its entirety.

According to a further embodiment of the present invention, the highlight-processing module 135 of the decoder 100 includes an internal memory 140 adapted to store a control bitmap data set. According to the present invention, each bit within the bitmap data set is associated with a corresponding pixel of the video and/or graphics data stream and controls the operation of the arithmetic operation carried out by the highlight processing module 135. According to an embodiment of the present invention, there is a 1:1 correspondence between the selected portion of the video and/or graphics data stream to be highlighted and the bits in the bitmap data set. This 1:1 correspondence allows displayed regions of arbitrary shape (e.g., non-rectangular) to be highlighted, by turning on and off selected bits within the bitmap data set. For example, when a bit within the bitmap data set assumes a first logical state, the corresponding pixel of the video and/or graphics data stream is highlighted and when the bit assumes a second logical state (the second logical state being opposite from the first logical state), the corresponding pixel in the data stream is not highlighted.

According to the present invention, highlighting is carried out by performing an arithmetic operation upon one or more of the color component values of the constituent pixels of the video and/or graphics data stream. In the red, green, blue (hereafter RGB) color space, the color component values include binary values (8-bit words, for example) for each of the R, G and B color components. Other color spaces include YUV (initially developed for PAL video, now also implemented in the CCIR standard for digital video) and YCbCr (a scaled and shifted version of YUV). In these YUV and YCbCr color spaces, the color component values include binary values (such as 8-bit words, for example) for each of the Y, U, V and Y, Cb, Cr components, respectively.

The arithmetic operation may be selected from among the group including addition, subtraction, multiplication and division, although other mathematical and/or logical operations may be advantageously carried out within the scope of the present invention. According to an embodiment of the present invention, the arithmetic operation is either addition or subtraction. An incremental value may be defined for each of the color component values of each pixel to be highlighted. These incremental values may be either added or subtracted, for example, from the color component values of the pixels of the original (prior to any highlighting) video and/or graphics data stream. The addition or subtraction of the incremental value to or from each color component of a pixel highlights the pixel; i.e., changes the appearance of the pixel, as rendered on a display. A highlighted pixel may be brighter or dimmer than a non-highlighted pixel and/or may exhibit changed chromaticity.

When a pixel within the video and/or graphics data stream is not to be highlighted, performance of the arithmetic operation may be skipped (i.e., the operation is not carried out) or the arithmetic operation may be carried out in such a manner as to leave the color component value in question unchanged. For example, when the aforementioned highlight control value stored in the (or one of the) programmable highlight control registers 145 is in a first logical state, the arithmetic operation is performed upon the color component values of the pixel being processed (by adding or subtracting a non-zero incremental value thereto, for example), thereby changing the resultant color component values, even if such changed color component values are subsequently clamped to within a selected range. When the highlight control value stored in the highlight control register 145 is in a second state opposite from the first state, the arithmetic operation is either not performed upon the current pixel being processed (i.e., performance of the arithmetic operation is skipped, leaving the color components for that pixel unchanged) or the arithmetic operation is performed, but leaves the color components for that pixel unchanged. For example, the arithmetic operation may add or subtract a zero value to each of the color components of the pixel in question, which is functionally the same as skipping the performance of the arithmetic operation. It may be preferable, however, to always perform the arithmetic operation and to cause the arithmetic operation to leave the color component values unchanged when it is not desired to highlight the pixel associated therewith. Alternatively, the constituent bits within the bitmap data set may control the operation of the arithmetic operations in the same manner as does the highlight control value. Alternatively still, the highlight control value and the bitmap data set may act in concert to control the highlighting of the pixels of the video and/or graphics data stream.

According to an embodiment of the present invention, when performance of the arithmetic operation results in a color component value that exceeds the allowable range of color component values for the color space in question, the resultant color component value is clamped to remain within a selected value range, to insure that the allowable range for that color component is not violated. For example, a color component may be clamped to a selected predetermined high value when performance of the selected arithmetic operation results in a color component value that exceeds the predetermined high value. Likewise, a color component may be clamped to a selected predetermined low value when performance of the selected arithmetic operation results in a color component value that falls below the predetermined high value.

According to an embodiment of the present invention, the range for the color components values is selected based upon the color space of the video and/or graphics data stream. For example, when the color space of the video and/or graphics data stream is digital YCbCr, the predetermined high value for the Y color component may be selected to be 235 and the predetermined high value for the Cb and Cr color component values may be selected to be 240. Similarly, in the YCbCr color space, the predetermined low value for each of the luminance (Y), blue chrominance (Cb) and red chrominance (Cr) color component values may be selected, for example, to be 16. When the color space of the video and/or graphics data stream is digital YUV, the predetermined high value for the Y color component may be selected to be 255, the predetermined high value for the U color component value may be selected to be 112 and predetermined high value for the V color component value may be selected to be 157. Still in the YUV color space, the predetermined low value for the Y color component may be selected to be 0, the predetermined low value for the U color component value may be selected to be −112 and predetermined low value for the V color component value may be selected to be −157. Other ranges for the color components values within each color space may be freely selected, without departing from the scope of the present invention. The range of allowable color component values within the digital YCbCr color space may abide, for example, to the International Telecommunications Union (ITU) ITU-R 601 standard (previously called CCIR 601), a widely used digital video format.

Figure 2:
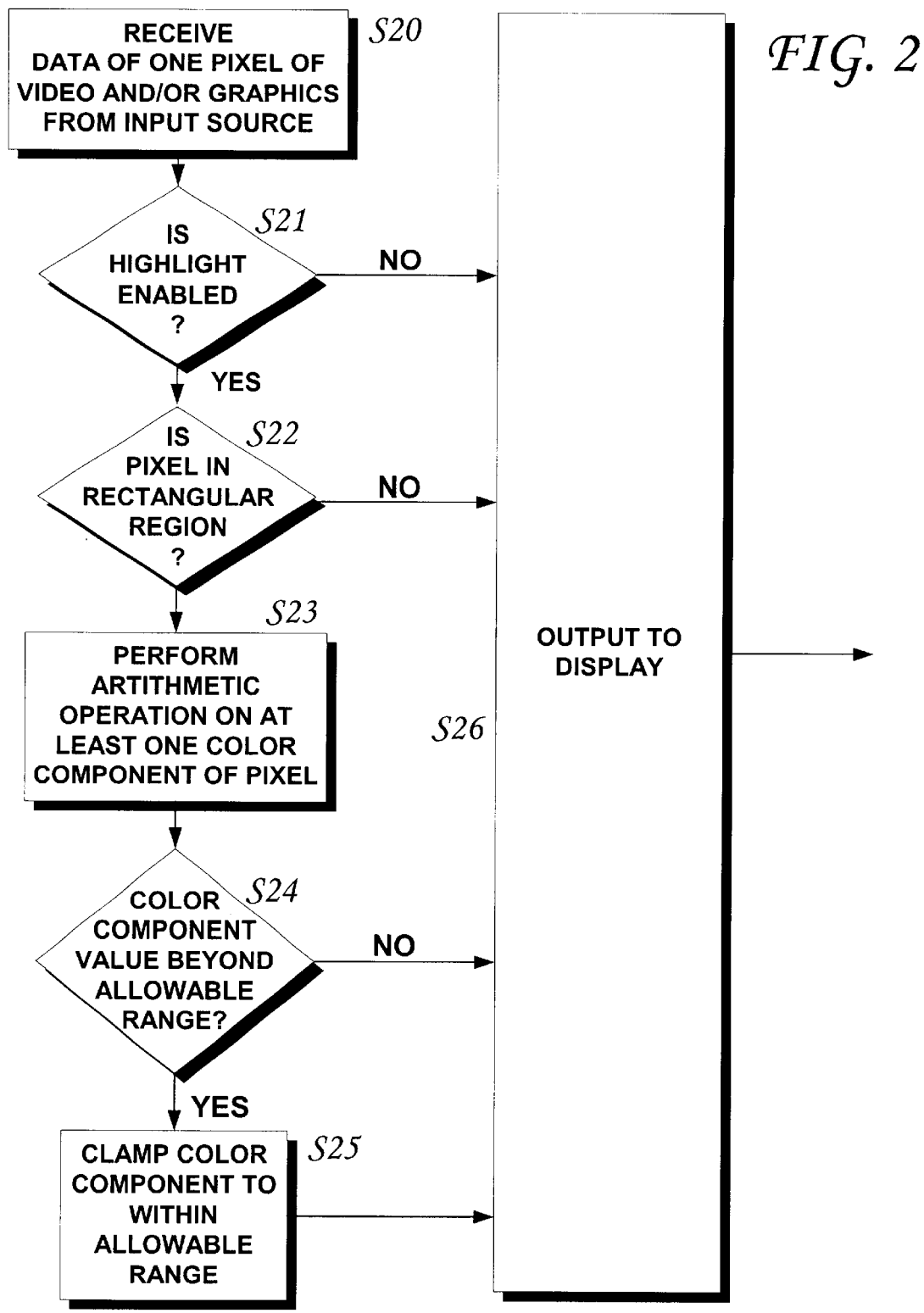
FIG. 2 is a flowchart of a method to create highlight effects on a video and/or graphics data stream, according to an embodiment of the present invention.

FIG. 2 is a flowchart of a method to create highlight effects on a video and/or graphics data stream, according to an embodiment of the present invention. As show therein, step S20 calls for the receipt of the data of one pixel of the video and/or graphics data stream from an input source such as, for example, a frame buffer (shown in FIG. 1 as the memory 130). In step S21, it is determined whether a highlight control bit is asserted. If the highlight control bit is not asserted, the method proceeds to step S26, and outputs the pixel data to the display, skipping the performance of the arithmetic operation and subsequent steps. If, however, the highlight control bit is asserted, meaning that the video and/or graphics data stream is to be selectively highlighted, step S22 is carried out, which calls for the determination of whether the current pixel is included within the rectangular region to be highlighted. This is done by reading the starting location and size of the rectangular region to be highlighted by reading the control registers 145, for example, in which these values are stored. In step S23, a selected arithmetic operation (such as addition or subtraction, for example) is carried out on at least one color component of the current pixel of the video and/or graphics data stream. This arithmetic operation may add or subtract a respective incremental value to each of the color components of the current pixel to be highlighted, for example. In step S24, it is determined whether the resultant color component values are beyond the allowable range for the color space in question. If the color components are not beyond the allowable range, the pixel may be outputted directly to the display, as shown in step S26. If one or more of the color components are in fact beyond the allowable range for the relevant color space, the color component or components that fall outside the allowable range are clamped within the allowable range, and the method proceeds to step S26 to output the pixel data to the display.

Figure 3:
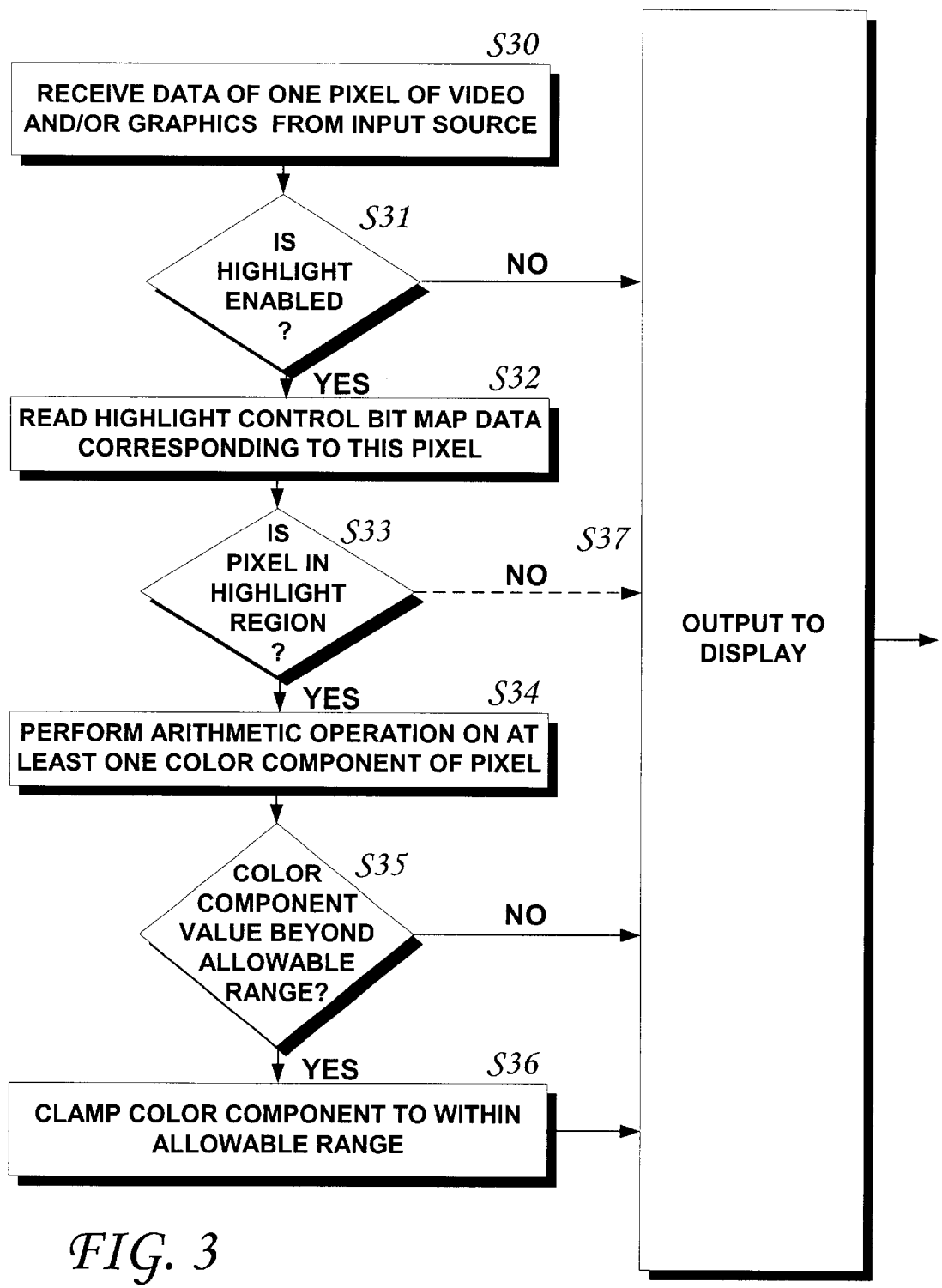
FIG. 3 is a flowchart of a method to create highlight effects on a video and/or graphics data stream, according to a further embodiment of the present invention.

FIG. 3 illustrates another embodiment of the method according to the present invention, wherein a bitmap data set is used to select those pixels that are to be highlighted. As shown therein, step S30 calls for the receipt of data of one pixel of the video and/or graphics stream from an input source, such as frame buffer 130. In step S31, it is determined whether a highlight control bit is asserted. If the highlight control bit is not asserted, the method proceeds to step S37, and outputs the pixel data to the display, skipping the performance of the subsequent steps. As shown in step S32, the highlight control bit map data corresponding to the current pixel is read. The highlight control bitmap data set may include an array of binary values (1 or 0), each of the bits within the data set corresponding to an associated pixel. It is then determined in step S33 whether the current pixel is in the region to be highlighted. This determination may be made from the reading of the highlight control bit map data of step S32. If, for example, the bit in the bit map data set corresponding to the current pixel is in a first logical state (for example, 0), the current pixel data may be output directly to the display, as shown by the dashed arrow from S33 to S37. If however, the bit in the bit map data set corresponding to the current pixel is in a second logical state (for example, 1), the method according to the present embodiment may proceed to step S34 in which an arithmetic operation may be performed on at least one color component of the pixel.

Alternatively, the determination of whether the currently processed pixel is in the highlight region in step S33 may determine whether the arithmetic operation in Step S34 changes or leaves unchanged the color component values of the currently processed pixel. For example, step S34 may add or subtracts zero (or otherwise leaves unchanged) to the color component values of the currently processed pixel when the associated bit within the bitmap data set is set in a first logical state (such as 0, for example). Similarly, a non-zero value is added or subtracted (for example) in step S34 to the color component values of the currently processed pixel when the associated bit within the bitmap data set is in a second logical state opposite from the first logical state (such as 1). In step S35, it is determined whether the color component values resulting from the arithmetic operation in step S34 are beyond the allowable range for that color space. If not, the corresponding pixel may be output directly to a display, as shown at S37. If the color component values resulting from the arithmetic operation in step S34 are indeed beyond the allowable range for that color space, the color components exceeding the allowable range may be clamped to within the allowable range of values for the color space in question, as shown at step S36 and the pixel data is output to the display, as shown at S37.

Use of a bitmap data set, as detailed above, allows non-rectangular regions of pixels to be highlighted with ease. Indeed, a region or regions of arbitrary shape may be highlighted by turning on and off selected bits within the highlight control bitmap data set. It should also be noted that, in both the embodiments illustrated in FIGS. 2 and 3, the data stored in the frame buffer need not be modified or copied in order to create highlight effects, thus saving both frame buffer memory 130 bandwidth and area. Moreover, the data in the frame buffer 130 is not changed. This means that, once highlighting is turned off, the display is able to immediately re-display the original (non-highlighted) data. The color control of the highlighting effect, according to the present invention, is simple. Indeed, to control the color or luminance characteristics of the highlighted pixels, it is only necessary to choose the incremental value that is to be added or subtracted to each of the color components of the pixels to be highlighted. Lastly, the highlighting is effectuated, according to the present invention, in a rapid manner, without the need to repeatedly swap data in and out of the frame buffer memory 130. The present invention may be implemented in hardware, software, firmware or a combination thereof.

Appendix A shows an implementation example of the present invention, as applied to the digital YCbCr color space.

While the foregoing detailed description has described certain embodiments of the present invention, it is to be understood that the above description is illustrative only and not limiting of the disclosed invention. For example, other ranges for the color component values may be implemented without, however, departing from the scope and spirit of the present invention. Other modifications may occur to those of skill in this art. Accordingly, the present invention to be limited only by the claims as set forth below.

APPENDIX

| | |
|---|---|
| Color space: | Digital YCbCr |
| Original pixel values (range: [0, 255]) | |
| Y color component: | original_value_y |
| Cb color component: | original_value_Cb |
| Cr color component: | original_value_Cr |
| Incremental values (range: [−255, 255]) | |
| Y color component: | delta_y |
| Cb color component: | delta_cb |
| Cr color component: | delta_cr |
| Resulting values after highlight operation: | |
| Y color component: | highlight_value_y |
| Cb color component: | highlight_value_cb |
| Cr color component: | highlight_value_cr |

-continued

APPENDIX

Resulting color component values after arithmetic operation (addition in this example):
```
Y color component:      adder_result_y
Cb color component:     adder_result_cb
Cr color component:     adder_result_cr
Operation Flow:
adder_result_y = original_value_y + delta_y;
adder_result_cb = original_value_cb + delta_cb;
adder_result_cr = original_value_cr + delta_cr;
if (adder_result_y < 0) {
      highlight_value_y = 0;
} else {
      if(adder_result_y > 255) {
         highlight_value_y = 255;
      } else {
         highlight_value_y = adder_result_y;
      }
}
if(adder_result_cb < 0) {
      highlight_value_cb = 0;
} else {
      if(adder_result_cb > 255) {
         highlight_value_cb = 255;
      } else {
         highlight_value_cb = adder_result_cb;
      }
}
if (adder_result_cr < 0) {
      highlight_value_cr = 0;
} else {
      if (adder_result_cr > 255) {
         highlight_value_cr = 255;
      } else {
         highlight_value_cr = adder_result_cr;
      }
}
Example:
If;
original_value_y = 255
original_value_Cb = 128
original_value_Cr = 128
and,
delta_y = −15
delta_cb = −64
delta_cr = 10;
then,
highlight_value_y = 240
highlight_value_cb = 64
highlight_value_cr = 138
```

In this example, the original color is white. The delta value is designed to reduce the blue color component so that the highlight color appears yellow on the display. The data outlet to the display may be limited to, for example, the range [1,254] in later operations.

What is claimed is:

1. A method for creating highlight effects in video and/or graphics data, comprising the steps of:
   receiving a video and/or graphics data stream from an input source;
   performing an arithmetic operation upon at least one color component value of constituent pixels of the data stream that are to be highlighted to provide a selectively highlighted video and/or graphics data stream;
   outputting the selectively highlighted video and/or graphics data stream directly to a display, and
   storing a highlight control bit in a control register, the highlight control bit controlling a performance of the arithmetic operation.

2. The method of claim 1, wherein the arithmetic operation is selected from a group including addition and subtraction.

3. The method of claim 1, wherein the input source includes a frame buffer.

4. The method of claim 3, wherein the frame buffer includes a dynamic random access memory (DRAM).

5. The method of claim 1, further comprising the step of clamping the at least one color component value within a selected value range.

6. The method of claim 5, wherein the value range is selected based upon a color space of the video and/or graphics data stream.

7. The method of claim 1, wherein the at least one color component value is clamped to a selected respective predetermined high value when performance of the selected arithmetic operation results in the color component value exceeding the predetermined high value.

8. The method of claim 1, wherein the at least one color component value is clamped to a selected respective predetermined low value when performance of the selected arithmetic operation results in the color component value falling below the predetermined low value.

9. The method of claim 7, wherein a color space of the video and/or graphics data stream is YCbCr and wherein the predetermined high value for the Y color component value is 235 and the predetermined high value for the Cb and Cr color component values is 240.

10. The method of claim 8, wherein a color space of the video and/or graphics data stream is YCbCr and wherein the predetermined low value for the Y, Cb and Cr color component values is 16.

11. The method of claim 7, wherein a color space of the video and/or graphics data stream is YUV and wherein the predetermined high value for the Y color component value is 255, the predetermined high value for the U color component value is 112 and the predetermined high value for the V color component value is 157.

12. The method of claim 8, wherein a color space of the video and/or graphics data stream is YUV and wherein the predetermined low value for the Y color component values is 0, the predetermined low value for the U color component value is −112 and the predetermined low value for the V color component value is —157.

13. The method of claim 1, further comprising the step of specifying a starting location and a size of a rectangular region wherein pixels of the data stream are to be highlighted.

14. The method of claim 1, further comprising the step of specifying a highlight control bitmap data set, each bit within the bitmap data set being associated with a pixel of the data stream and controlling a performance of the arithmetic operation.

15. The method of claim 14, wherein the arithmetic operation performing step leaves the at least one color component value unchanged when an associated bit within the bitmap data set is in a first logical state and wherein the arithmetic operation performing step changes the at least one color component value when the associated bit within the bitmap data set is in a second logical state.

16. The method of claim 15, further comprising the step of clamping the at least one color component value within a selected value range.

17. The method of claim 1, further comprising the step of defining an incremental value for each of the at least one color component values, each of the incremental values being one of added to and subtracted from respective ones of the at least one color component value to highlight a pixel associated therewith.

18. A multimedia decoder, including:

a memory bus and a control bus;

a processor coupled to the memory bus and to the control bus, the processor controlling an operation of the decoder;

a memory controller coupled to the memory bus, the memory controller being adapted to interface the decoder with a memory adapted to store video and/or graphics data;

a highlight processing module coupled to the memory and control buses, the highlight processing unit receiving a video and/or graphics data stream from the memory, and receiving instructions from the processor via the control bus to perform an arithmetic operation upon at least one color component value of each pixel of the data stream that is to be highlighted to provide a selectively highlighted video and/or graphics data stream and to output the selectively highlighted video and/or graphics data stream to a display without updating the memory video and/or graphics data stored in memory, the highlight processing module including at least one programmable highlight control register, at least one programmable register storing a highlight control value that is effective to enable and disable highlighting of the data stream.

19. The decoder of claim 18, wherein the highlight processing module includes internal memory, the internal memory being adapted to store a control bitmap data set, each bit within the bitmap data set being associated with a corresponding pixel of the data stream and controlling a performance of the arithmetic operation.

20. The decoder of claim 18, wherein the highlight processing module clamps the at least one color component value within a selected value range.

21. The decoder of claim 20, wherein the value range is selected based upon a color space of the video and/or graphics data stream.

22. The decoder of claim 18, wherein the at least one color component value is clamped to a selected respective predetermined high value when performance of the selected arithmetic operation results in the color component value exceeding the predetermined high value.

23. The decoder of claim 18, wherein the at least one color component value is clamped to a selected respective predetermined low value when performance of the selected arithmetic operation results in the color component value falling below the predetermined low value.

24. The decoder of claim 22, wherein a color space of the video and/or graphics data stream is YCbCr and wherein the predetermined high value for the Y color component value is 235 and the predetermined high value for the Cb and Cr color component values is 240.

25. The decoder of claim 23, wherein a color space of the video and/or graphics data stream is YCbCr and wherein the predetermined low value for the Y, Cb and Cr color component values is 16.

26. The decoder of claim 22, wherein a color space of the video and/or graphics data stream is YUV and wherein the predetermined high value for the Y color component value is 255, the predetermined high value for the U color component value is 112 and the predetermined high value for the V color component value is 157.

27. The decoder of claim 23, wherein a color space of the video and/or graphics data stream is YUV and wherein the predetermined low value for the Y color component value is 0, the predetermined low value for the U color component value is −112 and the predetermined low value for the V color component value is −157.

28. The decoder of claim 18, further comprising highlight control registers adapted to store a starting location and a size of a rectangular region wherein pixels of the data stream are to be highlighted.

29. The decoder of claim 19, wherein performance of the arithmetic operation leaves the at least one color component value unchanged when an associated bit within the bitmap data set is in a first logical state and wherein the arithmetic operation performing step changes the at least one color component value when the associated bit within the bitmap data set is in a second logical state.

30. The decoder of claim 29, wherein the highlight processing module clamps the at least one color component value within a selected value range.

31. The decoder of claim 18, wherein each pixel within the video and/or graphics data stream includes a highlight control value that is stored along with the color component values defining the pixel, the highlight control value controlling a performance of the arithmetic operation.

32. The decoder of claim 18, wherein the highlight control module includes a highlight control register adapted to store a highlight control value, the highlight control value controlling a performance of the arithmetic operation.

33. The decoder of claim 18, wherein an incremental value is defined for each of the at least one color component values, each of the incremental values being one of added to and subtracted from respective ones of the at least one color component values to highlight a pixel associated therewith.

* * * * *